Oct. 28, 1941.  W. D. HUNT  2,261,086
CRANKSHAFT LATHE
Filed Oct. 20, 1939  2 Sheets-Sheet 1
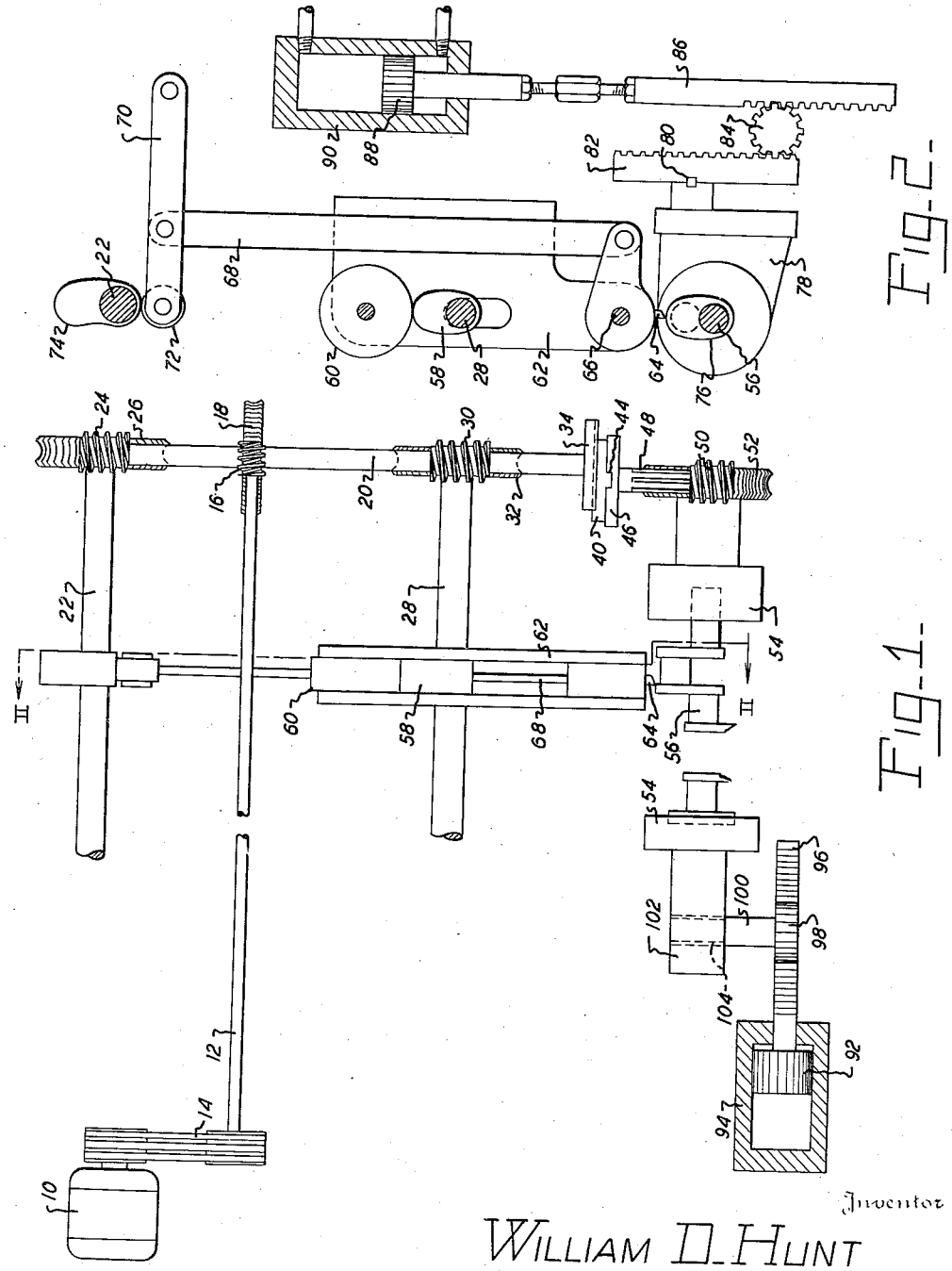
Inventor
WILLIAM D. HUNT
By Beaman & Langford
Attorney

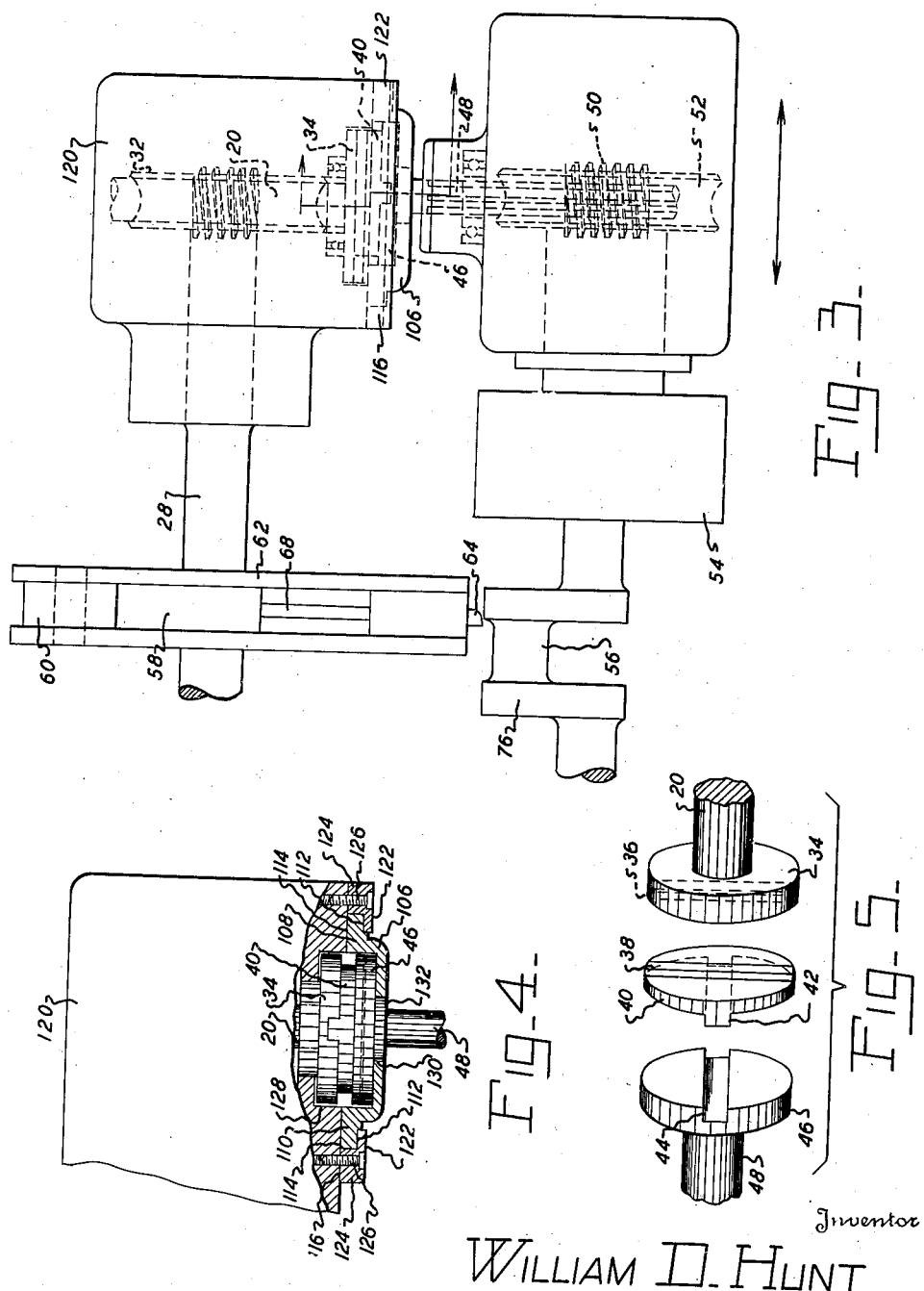

Patented Oct. 28, 1941

2,261,086

UNITED STATES PATENT OFFICE 2,261,086

CRANKSHAFT LATHE

William D. Hunt, Jackson, Mich., assignor to Crankshaft Machine Company, Jackson, Mich., a corporation of Michigan Application October 20, 1939, Serial No. 300,291

6 Claims. (Cl. 82—9)

The present invention relates to improvements in machine tools, having particular reference to machines for turning or otherwise machining eccentric parts and parts of irregular contour or shape. In crankshaft lathes, for example, it is essential that the work and tool be driven in absolute synchronism if accurate results are to be obtained. Where the chucks for the crankshaft as well as the tool carriages are actuated through a common power transmission, with provision for transverse relative feed between the tools and crankshaft, the problem of synchronism in operation must be given considerable attention if it is to be simple and practical in construction and operation.

More specifically the present invention comprises an improvement in drive and feed arrangement for crankshaft lathes and the like in which the principles of an Oldham coupling are utilized in a novel manner permitting relative transverse feed between the work and tool without lag or lead in the timed operation of parts desired to be driven in synchronism.

Thus the primary object of the present invention is to utilize the principles of an Oldham coupling in a novel feed and drive arrangement for machine tools such as crankshaft lathes and the like.

Other objects of the invention reside in the specific arrangement, construction and combination of parts as will more fully appear from the detailed description to follow and from a consideration of the annexed claims.

Referring to the drawings,

Fig. 1 is a diagrammatic plan view of the invention embodied in a crankshaft contour lathe, Fig. 2 is a partial cross-sectional view taken on the line II—II of Fig. 1, Fig. 3 is an enlarged plan view of the coupling and feed unit, Fig. 4 is a partial cross-sectional view through the housing of the coupling and feed unit taken on line IV—IV of Fig. 3, and Fig. 5 is an exploded view of one form of Oldham coupling that may be employed.

In Fig. 1, for sake of simplicity, only one side of the mechanism for driving the tools and work piece are diagrammatically illustrated; in practice all parts are driven from both sides of the machine which is shown as a crankshaft contour lathe.

An electric motor 10 drives a main drive shaft 12 through a suitable belt and pulley arrangement 14. The worm 16 on the shaft 12 meshes with the wheel 18 to rotate the cross-shaft 20. The tool control shaft 22 is rotated by a worm 24 on the shaft 20 meshing with the worm wheel 26, while the master cam shaft 28 is rotated by a similar worm 30 on the shaft 20 meshing with a worm wheel 32.

Keyed to the shaft 20 is a disc 34 having a way or groove 36 in which is geared the feather 38 of the floating disc 40 which in turn has a second feather 42 at right angles to the first feather 38 and which meshes with a way or groove 44 in the disc 46 keyed to the spline shaft 48. The spline shaft 48 is slidable within a worm 50 driving a worm wheel 52 which in turn drives the chuck 54 in which the crankshaft 56 is supported and rotated.

Keyed to the shaft 28 are cams 58 which act upon roller followers 60 for moving the tool carriages 62 toward and from the axis of rotation of the crankshaft 56. Tools 64 are pivotally supported for rocking movement around the axles 66. A link 68 connected to a swinging arm 70 having a roller follower 72 engaging with a cam 74 upon the shaft 22 maintains the correct cutting angle of the tool of each tool carriage. It will be understood that the cams 58 are a replica of the contour of the cheeks 76 of the crankshaft 56 when machined. Relative feeding movement between the tools 64 and the cheeks 76 of the crankshaft 56 is accomplished through the following structure. The super structure 78 in which the chucks 54 are supported at opposite ends of the crankshaft is keyed at 80 to the rack 82 meshing with the gear 84 which in turn meshes with the rack 86 operated by the piston 88 working in the hydraulic cylinder 90. The super structure 78 is freely slidable in a direction parallel with the axis of the key 80 to enable the tools 64 to be fed across the face of the cheeks 76. Movement of the super structure 78 in this direction is effected through movement of the piston 92 working in the hydraulic cylinder 94 connected to the rack 96 meshing with the pinion 98 mounted on the shaft 100. The super structure 78 is provided with a rack 102 connected with a pinion 104 keyed to the shaft 100.

The illustrated construction for taking care of the feeding movements of the crankshaft supporting and rotating structure through the aforesaid driving mechanism will now be described: To enable the Oldham coupling unit of Fig. 5 to operate in an oil bath, a rectangular shaped cover plate 106 is provided with upper and lower flange portions 108 and 110 having spaced flat face portions 112 and 114 which slide between the horizontal track defined by the flat face 116 of the housing 120 and the inner faces of the projection flange portions 122 of the elongated rail members 124 secured in position to the housing 120 by screws 126. It will be understood that the cover 106 in all positions overlaps the opening 128 in the housing 120 to seal the same. A suitable oil seal (not shown) may be employed to seal the opening 130 in which the collar 132 of the disc 46 attached to the shaft 48 extended.

The operation of the coupling and feed construction follows: As more clearly shown in Fig. 4, the floating disc 40 of the Oldham coupling is of smaller diameter than the discs 34 and 46; the difference in diameter being sufficient to enable an out-of-line positioning of the shafts 20 and 48 capable of taking care of the limits of the endwise feeding movement of crankshaft supporting and rotating structure yet confining the projection of the disc 40 to within the opening 128. Obviously, the relative size of the floating disc 40 may be other than illustrated as it is only necessary that the same has sufficient clearance with surrounding structure as to accommodate the limits of the transverse feeding movement of the crankshaft 56 relative to the tools 64. As the crankshaft is endwise fed through movement of the piston 92 by fluid pressure, the cover plate will traverse its horizontal track way sealing the opening 128 in the housing 120. As the shaft 48 is transversely moved relative to the axis of rotation of the shaft 32, the floating disc 40, in a known manner, will function to drive the shaft 48 from the shaft 32 with right angle torque transmission maintaining perfect timing between the shafts 12, 22, 28 and the crankshaft 56. The spline arrangement between the shaft 48 and the worm 50 enables the feed piston 88 operating in the cylinder 90 to move the crankshaft 56 toward the tools 64 to bring the tools to depth.

Having thus described my invention, what I desire to secure by Letters Patent and claim is:

1. In a crankshaft lathe or the like, work and tool manipulating shafts, drive means for rotating said shafts in timed relation, said means including an Oldham coupling, feed mechanism for effecting relative movement between the work and tool, and means constituting a connection between said feed mechanism and one part of said coupling whereby the misalignment of said coupling parts corresponds to the feed of said mechanism.

2. In combination in a crankshaft lathe or the like, work supporting and rotating structure, tool structure, feed mechanism for relatively feeding said structures, rotated shafting mechanism, said shafting mechanism including an Oldham coupling having spaced coupling members and a floating central member for gearing said members to each other, and means supporting one of said members for said relative feeding movement.

3. In a crankshaft lathe, a rotatable work holder, means supporting said holder for feeding movement along its axis of rotation, shafting for rotating said holder having its axis of rotation normal to said first axis, said shafting having one portion supported for unitary movement with said holder during a feeding movement along the axis of rotation of said holder, another portion of said shafting being fixedly supported for rotation relative to said feeding movement, and an Oldham coupling inserted between said shafting portions.

4. In a crankshaft lathe or the like, the combination with a chuck spindle, a drive for said spindle including a shaft, tool carriages, mechanism for operating said tool carriages including a second shaft, an Oldham coupling having its outer members fixed to spaced opposed ends of said shafts, a floating member coupling said members over a predetermined offset range, and feed mechanism causing said shafts to be fed relative to each other within said range.

5. In combination, a rotatable work holder, tool structure including tools, feed mechanism for relatively feeding said tools normal to the axis of rotation of said holder, feed mechanism for relatively feeding said tools along the axis of rotation of said holder, shafting for rotating said tool holder having portions thereof movable in unison with said feed movement, and an Oldham coupling inserted in said shafting and having one of the coupling members thereof moving transversely of its axis of rotation in unison with one of said feeding movements.

6. In a crankshaft lathe, a rotatable work holder, means supporting said holder for feeding movement along its axis of rotation, shafting for rotating said holder having its axis of rotation normal to said first axis, said shafting having one portion supported for unitary movement with said holder during a feeding movement along the axis of rotation of said holder, another portion of said shafting being fixedly supported for rotation relative to said feeding movement, an Oldham coupling inserted between said shafting portions, a housing for said coupling having an opening, a cover plate for said opening, means supporting said plate for movement parallel to the axis of rotation of said holder in sealing relation with said opening, said first shafting portion extending through said cover plate to said coupling in sealed relation with said cover plate, said cover plate having the feeding movement of said first shafting portion along the axis of rotation of said holder.

WILLIAM D. HUNT.